(12) United States Patent
Rao et al.

(10) Patent No.: US 12,439,149 B2
(45) Date of Patent: Oct. 7, 2025

(54) WEARABLE DEVICE AND IMAGE SIGNAL PROCESSING APPARATUS THEREOF

(71) Applicant: SPREADTRUM COMMUNICATIONS (SHANGHAI) CO., LTD., Shanghai (CN)

(72) Inventors: Guoming Rao, Shanghai (CN); Huimin Zhang, Shanghai (CN); Zhengfei Xiao, Shanghai (CN); Bo Chen, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 305 days.

(21) Appl. No.: 18/023,437

(22) PCT Filed: Aug. 27, 2021

(86) PCT No.: PCT/CN2021/114896
§ 371 (c)(1),
(2) Date: Feb. 27, 2023

(87) PCT Pub. No.: WO2022/042671
PCT Pub. Date: Mar. 3, 2022

(65) Prior Publication Data
US 2024/0031672 A1    Jan. 25, 2024

(30) Foreign Application Priority Data
Aug. 31, 2020   (CN) .......................... 202010900334.X

(51) Int. Cl.
*H04N 23/65*   (2023.01)
*H04N 23/63*   (2023.01)
*H04N 23/80*   (2023.01)

(52) U.S. Cl.
CPC ......... *H04N 23/651* (2023.01); *H04N 23/631* (2023.01); *H04N 23/80* (2023.01)

(58) Field of Classification Search
CPC .... H04N 23/651; H04N 23/631; H04N 23/80; H04N 23/665; H04N 23/50; H04N 23/65
See application file for complete search history.

(56) References Cited

U.S. PATENT DOCUMENTS

| 2014/0156269 A1* | 6/2014 | Lee ........................ G06F 1/3287 704/231 |
| 2014/0208145 A1* | 7/2014 | Piccolotto ................ G09G 3/20 713/324 |

(Continued)

FOREIGN PATENT DOCUMENTS

| CN | 105791679 A | 7/2016 |
| CN | 106506960   | * 3/2017 |

(Continued)

OTHER PUBLICATIONS

International Search Report for International Application No. PCT/CN2021/114896; Mailing Date, Nov. 18, 2021.

*Primary Examiner* — Hung H Lam
(74) *Attorney, Agent, or Firm* — CANTOR COLBURN LLP

(57) ABSTRACT

A wearable device and an image signal processing apparatus thereof are provided. The image signal processing apparatus comprises an image acquisition device, an image data processing module, and an application processor; the application processor is used for controlling, when detecting that the wearable device enables a shooting preview mode, the image data processing module to switch from a sleep state or a power-down state to a working state; the image acquisition device is used for acquiring original image data; the (Continued)

image data processing module is used for obtaining the original image data and processing the original image data.

16 Claims, 3 Drawing Sheets

(56) References Cited

U.S. PATENT DOCUMENTS

| | | | |
|---|---|---|---|
| 2015/0103224 A1* | 4/2015 | Min | H04N 23/63 |
| | | | 348/333.13 |
| 2016/0105162 A1 | 4/2016 | Zangi et al. | |
| 2016/0162002 A1* | 6/2016 | Liang | G06F 1/3203 |
| | | | 713/323 |
| 2021/0286957 A1* | 9/2021 | Cao | G06F 40/58 |

FOREIGN PATENT DOCUMENTS

| | | | | |
|---|---|---|---|---|
| CN | 106506960 A | | 3/2017 | |
| CN | 106686305 | * | 5/2017 | ............ H04N 23/80 |
| CN | 106686305 A | | 5/2017 | |
| CN | 111327814 A | | 6/2020 | |
| CN | 111988511 A | | 11/2020 | |
| WO | 2020077523 A1 | | 4/2020 | |

* cited by examiner

WEARABLE DEVICE AND IMAGE SIGNAL PROCESSING APPARATUS THEREOF

CROSS REFERENCE TO RELATED APPLICATIONS

This is the U.S. national stage of application No. PCT/CN2021/114896, filed on Aug. 27, 2021. Priority under 35 U.S.C. § 119(a) and 35 U.S.C. § 365(b) is claimed from Chinese Application No. 202010900334.X, filed Aug. 31, 2020, the disclosure of which is also incorporated herein by reference.

FIELD

The present disclosure relates to the technical field of intelligent devices, and in particular to a wearable device and an image signal processing apparatus for the wearable device.

BACKGROUND

At present, intelligent wearable devices have increasingly become a hot spot in the market. Smart watches (such as smart watches for children, fashion watches for adults, smart watches for elderly, and the like) and smart glasses (such as fashion glasses for adults, and the like) are the most widely used devices. The smart watches and the smart glasses support cameras and various applications, for example, functions such as video call, remote photo taking, remote parental control, and eye tracking, and provide rich and colorful applicable situations, thereby satisfying higher user demands.

Due to small external physical size and low battery capacity of the wearable devices, limitation is exerted on such devices for support a camera. Although some methods are provided to alleviate the above problems, there are still problems such as too much power consumption and too low supported pixels, and user demand can still not be satisfied well.

SUMMARY

The technical problem to be solved by the present disclosure is to provide a wearable device and an image signal processing apparatus for the wearable device.

An image signal processing apparatus for a wearable device is provided according to the present disclosure. The image signal processing apparatus includes an image acquisition device, an image data processing module, and an application processor, the image data processing module is in communication with the image acquisition device and the application processor, the application processor is configured to control, in a case of detecting that the wearable device enables a shooting preview mode, the image data processing module to switch from a sleep state or a power-down state to a working state, the image acquisition device is configured to acquire original image data, and the image data processing module is configured to obtain the original image data and process the original image data.

A wearable device is further provided according to the present disclosure. The wearable device includes the image signal processing apparatus for a wearable device described above.

On the basis common sense in the art, the above preferred conditions can be combined in any form to obtain preferred embodiments of the present disclosure.

DETAILED DESCRIPTION OF EMBODIMENTS

The present disclosure is further described in connection with the following embodiments. However, the present disclosure is not limited to the following embodiments.

Embodiment 1

Figure 1:
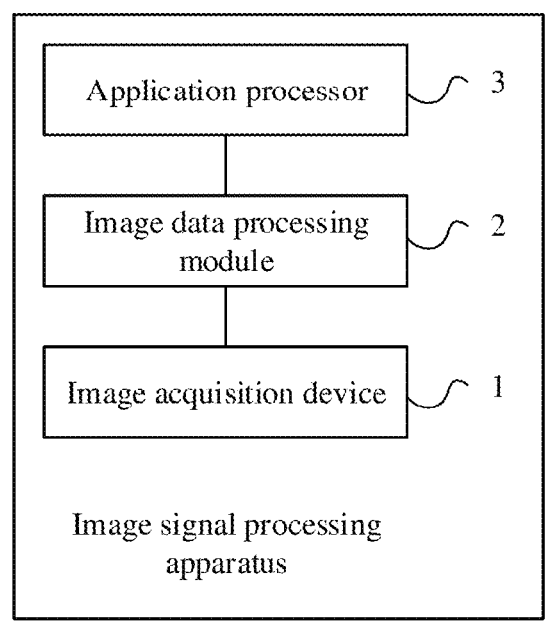
FIG. 1 is a schematic structural diagram of an image signal processing apparatus for a wearable device according to Embodiment 1 of the present disclosure.

As shown in FIG. 1, the image signal processing apparatus for a wearable device according to this embodiment includes an image acquisition device 1, an image data processing module 2, and an application processor 3. The wearable device includes but is not limited to a smart watch and smart glasses.

The image data processing module 2 is in communication with the image acquisition device 1 and the application processor 3.

Under a normal condition, the wearable device disables a shooting preview function. In this case, the image data processing module 2 is in a sleep state or a power-down state, and only the AP application processor operates. The image data processing module 2 enters a working state only in a case that the shooting preview function is enabled. That is, the image data processing module 2 is not required to remain in the working state all the time, which effectively saves operational power consumption.

The application processor 3 is configured to generate, in a case of detecting that the wearable device enables the shooting preview mode, a first control instruction to control the image data processing module 2 to switch from the sleep state or the power-down state to the working state.

The image acquisition device 1 is configured to acquire original image data.

The image data processing module 2 is configured to obtain the original image data and process the original image data.

In addition, the application processor 3 is configured to generate, in a case of detecting that the wearable device disables the shooting preview mode, a second control instruction to control the image data processing module 2 to switch from the working state to the sleep state or the power-down state. That is, in a case that the shooting preview function is disabled, the image data processing module 2 consumes no power or little power, which reduces operational power consumption.

In a case that the image data processing module 2 is in the working state, the application processor 3 automatically switches to the sleep state. That is, the application processor 3 with high power consumption is not required to participate in the image processing process, which further reduces the power consumption.

The execution of the image processing function in the preview mode is performed by the image data processing module 2 independently, and the application processor 3 with high power consumption is not required to directly participate in the processing, which greatly reduces the power consumption caused by running of a program, thereby effectively saving the power consumption of the wearable device during operation and enhancing battery life of wearable devices.

Figure 2:
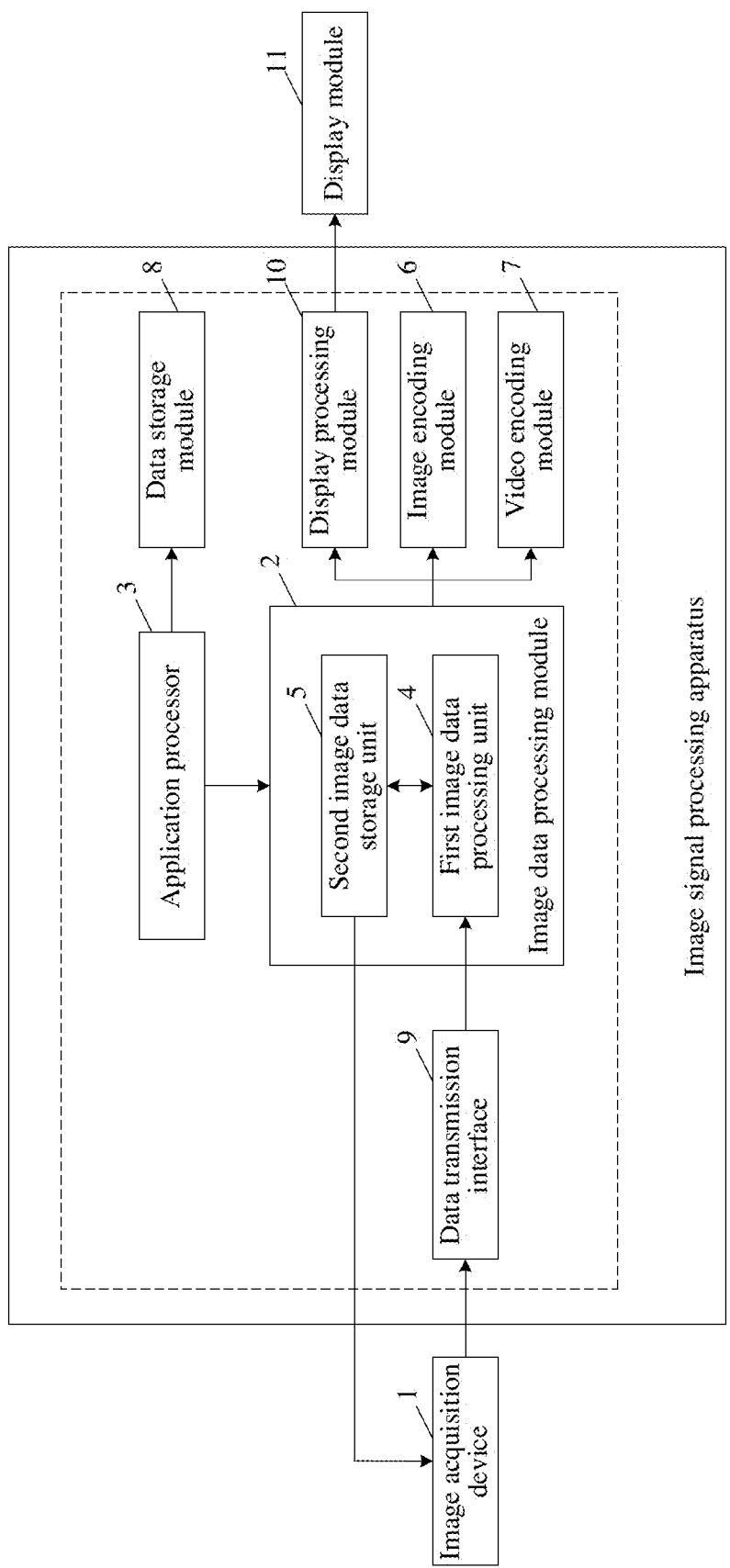
FIG. 2 is a schematic structural diagram of an image signal processing apparatus for a wearable device according to the Embodiment 1 of the present disclosure.

Specifically, as shown in FIG. 2, the image data processing module 2 includes a first image data processing unit 4 and a second image data processing unit 5. The image acquisition device 1 is in communication with the first image data processing unit 4, and the second image data processing unit 5 is in communication with the image acquisition device 1 and the first image data processing unit 4.

The first image data processing unit 4 is configured to acquire original image data, preprocess the original image data to obtain first image data, and transmit the first image data to the second image data processing unit 5.

The second image data processing unit 5 is configured to process the first image data using a target algorithm to obtain a processing result and control the image acquisition device 1 and/or the first image data processing unit 4 based on the processing result.

Operational power consumption of the second image data processing unit 5 is lower than operational power consumption of the application processor 3.

In an optional implementation, the first image data processing unit 4 is an ISP, and the second image data processing unit 5 is an MCU. Operational power consumption of the MCU is far less than operational power consumption of an AP (i.e., the application processor) chip with a Cortex-A (a processor) architecture.

The ISP preprocesses the acquired original image data through an ISP Hardware Pipeline. For example, the ISP performs processing such as AEC (Automatic Exposure Control), AWB, Anti-Flicker and the like on the original image data and transmits the processed image data to the MCU for subsequent processing.

The target algorithm includes but is not limited to 3A algorithms. The 3A algorithms represent an algorithm library running on ISP firmware, including AE/AF/AWB/AFL algorithms and the like. That is, in this embodiment, the MCU with low power consumption serves as an ISP firmware running platform to run the 3A algorithms, effectively reducing the power consumption generated in the whole image processing process and effectively improving the battery life of the wearable device.

The MCU runs on an RTOS operating system (a real-time, lightweight micro kernel operating system different from an intelligent operating system such as Android, Windows, and IOS, which is a ultra-low power consumption operating system that may be applied to an MCU controller and provide a microsecond response speed). In addition, in a case that a part for algorithm processing is removed from the application processor 3, the application processor 3 may has an MCU architecture, which further reduces the power consumption caused by running of a program, and suitable for application in a wearable device with low-power consumption.

The MCU includes but is not limited to an ARM-M series, RISC-V, MIPS, MCS-51 (the ARM-M series, the RISC-V, the MIPS, and the MCS-51 are micro control units).

In addition, the image signal processing apparatus further includes an image encoding module 6, a video encoding module 7, a data storage module 8, a data transmission interface 9, a display control module 10, and a display module 11.

The image encoding module 6 and the video encoding module 7 are in communication with the second image data processing unit 5 and the application processor 3. The data storage module 8 is in communication with the application processor 3.

The image encoding module 6 is configured to perform image encoding processing based on an image parameter in the processing result to obtain an image encoding result and transmit the image encoding result to the application processor 3.

The video encoding module 7 is configured to perform video encoding processing based on the image parameter in the processing result to obtain a video encoding result and transmit the video encoding result to the application processor 3. The image parameter in the processing result is parameter data in YUV format (an image format).

The application processor 3 is configured to transmit the image encoding result and the video encoding result to the data storage module 8 for storage.

The data transmission interface 9 is in communication with the image acquisition device 1 and the first image data storage unit.

The first image data storage unit obtains the original image data acquired by the image acquisition device 1 through the data transmission interface 9.

The data transmission interface 9 includes but is not limited to an MIPI CSI interface.

The display processing module is in communication with the second image data processing unit 5 and the display module 11.

The display processing module is configured to perform display processing on the processing result to obtain a display processing result and transmit the display processing result to the display module 11 for display. The display module 11 displays an image in RGB format (an image format).

The image data processing module 2, the application processor 3, the data transmission interface 9, the image encoding module 6, the video encoding module 7, the data storage module 8 and the display control module 10 are built into an SOC chip of the wearable device.

The image acquisition device 1 is a camera that supports RAW Sensor. Specifically, the image acquisition device 1 includes a camera and an image sensor. The image sensor is configured to acquire the original image data through the camera and transmit the original image data to the first image data processing unit 4 through the data transmission interface 9. The image sensor communicates data with the second image data processing unit through an I2C bus. The image sensor includes but is not limited to an RAW sensor, supporting output of original image data in Bayer format.

The processing result of the second image data processing unit 5 includes a first control parameter and a second control parameter. The second image data processing unit 5 is configured to transmit the first control parameter to the first image data processing unit 4, and the first image data processing unit 4 is configured to select proper processing on the original image data based on the first control parameter, to optimize the image data processing.

The second image data processing unit 5 is further configured to transmit the second control parameter to the image sensor in the image acquisition device 1. The image sensor is configured to acquire the original image data properly and effectively based on the second control parameter to optimize the image data acquisition, which effectively improves image processing ability of the image signal processing apparatus and ensures quality of an outputted image, thereby automatically adjusting quality of the image, and improving performance of the wearable devices. Therefore, a high-quality shooting experience is realized and user's requirements for pixels are met.

Figure 3:
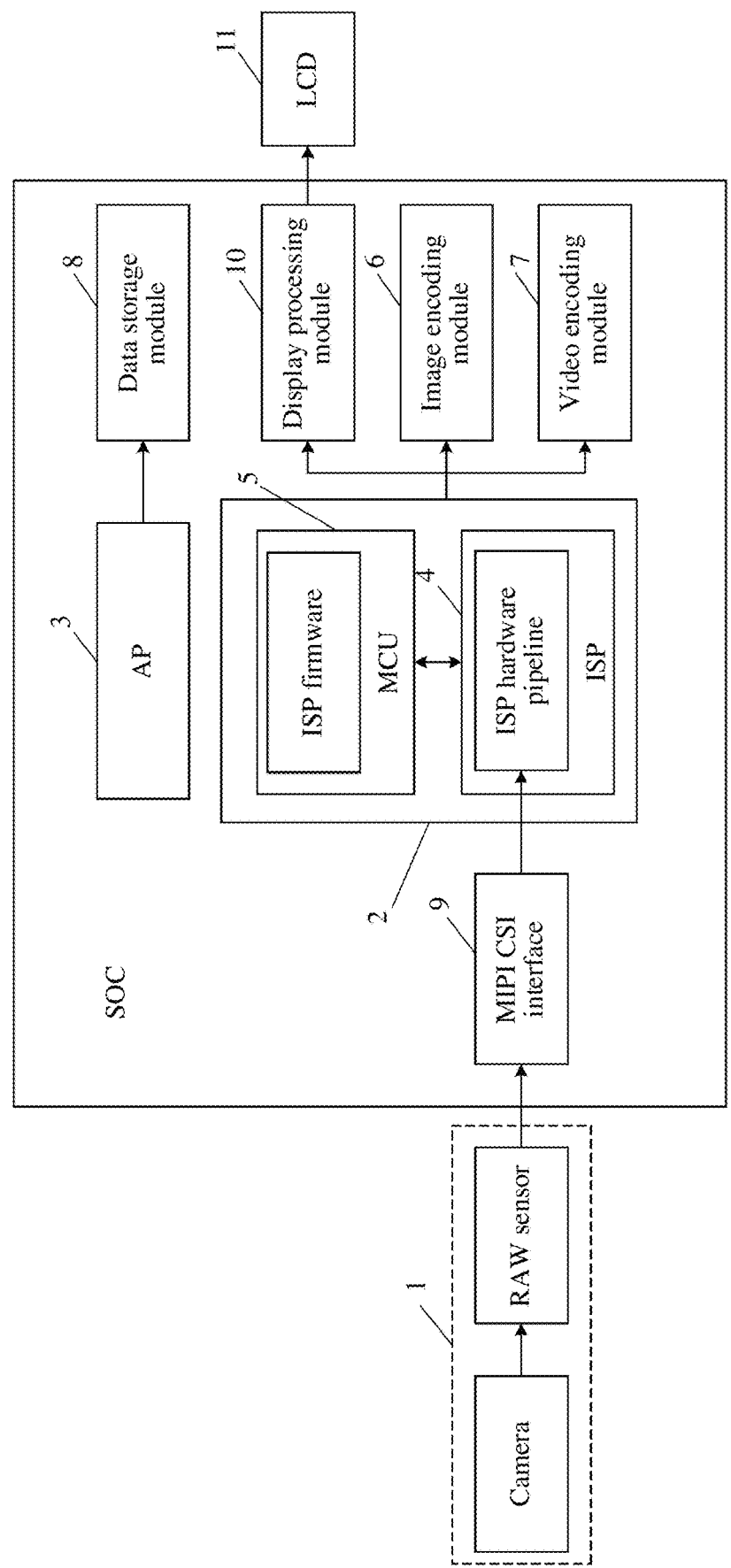
FIG. 3 is a schematic structural diagram of an image signal processing apparatus for a wearable device according to the Embodiment 1 of the present disclosure.

Components and connection relationship between the components of the image signal processing apparatus according to this embodiment may be known through the schematic structural diagram shown in FIG. 3. Specifically, a Lens (i.e., a camera) and an RAW Sensor constitute the image acquisition device for acquiring the original image data. The AP (i.e. the application processor), the ISP (ISP Hardware Pipeline, i.e. the first image data processing unit), the MCU (ISP firmware, i.e. the second image data processing unit), the MIPI CSI interface (i.e. the data transmission interface), the Display Unit (i.e. the display processing module), the JPEG Encode (i.e. the image encoding module), the Video Encode (i.e. the video encoding module) and an LCD (i.e. the display module) are built into the SOC chip.

In addition, in a case that the wearable device is an intelligent device such as a smart watch or smart glasses, an autofocus function may be canceled in this embodiment, and only an FF (fixed focus) camera module is required to be supported. In this way, the image data processing module 2 is not required to control the camera through feedback, which reduces computational requirements for the MCU, thereby further reducing the power consumption for the operation of the wearable device.

In this embodiment, a new ISP architecture is designed for the wearable devices. In a case that the device is in a shooting state, the MCU independently processes the image data using an algorithm. That is, the AP does not participate in the algorithm calculation process, which effectively reduces power consumption. In the shooting state, the AP automatically switches to the sleep state, which further reduces the power consumption. In addition, based on the processing result subjected to processing by the MCU, the image acquisition device is controlled through feedback to select an appropriate parameter for acquiring the original image data, and the ISP is controlled through feedback to select an appropriate parameter for processing the image data, which effectively improves the image processing ability of the image signal processing apparatus and improves the photographing quality of the wearable device, thereby automatically adjusting quality of the image, improving the user experience and satisfying user demands well.

Embodiment 2

The wearable device according to this embodiment includes the image signal processing apparatus for a wearable device according to the Embodiment 1. The wearable device includes but is not limited to a smart watch or smart glasses.

The ISP architecture described above is applied to the wearable device according to this embodiment. In a case that the device is in a shooting state, the MCU independently processes the image data using an algorithm. That is, the AP does not participate in the algorithm calculation process, which effectively reduces power consumption. In the shooting state, the AP automatically switches to the sleep state, which further reduces the power consumption, thereby effectively saving the power consumption. In addition, quality of the image is automatically adjusted, thereby improving the user experience, and satisfying user demands well.

Although the embodiments of the present disclosure are described above, those skilled in the art should understand that the embodiments are only examples, and the protection scope of the present disclosure is defined by the claims. Those skilled in the art can make various changes or modifications to these embodiments without departing from the principle and essence of the present disclosure, and these changes and modifications fall into the protection scope of the present disclosure.

The invention claimed is:

1. An image signal processing apparatus for a wearable device, comprising an image acquisition device, an image data processor and an application processor, wherein:
the image data processor is in communication with the image acquisition device and the application processor;
the application processor is configured to control, in a case of detecting that the wearable device enables a shooting preview mode, the image data processor to switch from a sleep state or a power-down state to a working state;
the image acquisition device is configured to acquire original image data; and
the image data processor is configured to obtain the original image data and process the original image data;
wherein the image data processor comprises a first image data processor and a second image data processor;
the image acquisition device is in communication with the first image data processor, and the second image data processor is in communication with the image acquisition device and the first image data processor;
the first image data processor is configured to obtain the original image data, preprocess the original image data to obtain first image data, and transmit the first image data to the second image data processor;
the second image data processor is configured to process the first image data using a target algorithm to obtain a processing result, and control the image acquisition device and/or the first image data processor based on the processing result; and
operational power consumption of the second image data processor is less than operational power consumption of the application processor.

2. The image signal processing apparatus for a wearable device according to claim 1, wherein the second image data processor comprises a Microprogrammed Control Unit.

3. The image signal processing apparatus for a wearable device according to claim 1, wherein the first image data processor comprises an image signal processor.

4. The image signal processing apparatus for a wearable device according to claim 3,
wherein the target algorithm comprises auto focus, auto exposure, and automatic white balance algorithms.

5. The image signal processing apparatus for a wearable device according to claim 1, wherein the application processor is configured to control, in a case of detecting that the wearable device disables the shooting preview mode, the image data processor to switch from the working state to the sleep state or the power-down state, wherein the application processor automatically switches to the sleep state in a case that the image data processor is in the working state.

6. The image signal processing apparatus for a wearable device according to claim 1, further comprising an image encoder, a video encoder and a data storage, wherein
the image encoder and the video encoder are in communication with the second image data processor and the application processor, and the data storage is in communication with the application processor;

the image encoder is configured to perform image encoding processing based on an image parameter in the processing result to obtain an image encoding result and transmit the image encoding result to the application processor;

the video encoder is configured to perform video encoding processing based on the image parameter in the processing result to obtain a video encoding result and transmit the video encoding result to the application processor; and the application processor is configured to transmit the image encoding result and the video encoding result to the data storage for storage.

7. The image signal processing apparatus for a wearable device according to claim 6, wherein:
the image signal processing apparatus further comprises a display controller and a displayer, wherein
the display processor is in communication with the second image data processor and the displayer;
the display processor is configured to perform display processing on the processing result to obtain a display processing result and transmit the display processing result to the displayer for display; and/or
the image signal processing device further comprises a data transmission interface; wherein
the data transmission interface is in communication with the image acquisition device and the first image data storage unit; and
the first image data storage unit obtains the original image data acquired by the image acquisition device through the data transmission interface.

8. The image signal processing apparatus for a wearable device according to claim 7, wherein:
the image data processor, the application processor, the data transmission interface, the image encoding encoder, the video encoder, the data storage and the display controller are built into an SOC chip of the wearable device; and/or
the data transmission interface comprises a Mobile Industry Processor Interface-Camera Serial Interface.

9. A wearable device, comprising an image signal processing apparatus wherein the image signal processing apparatus comprises an image acquisition device, an image data processor and an application processor, wherein:
the image data processor is in communication with the image acquisition device and the application processor;
the application processor is configured to control, in a case of detecting that the wearable device enables a shooting preview mode, the image data processor to switch from a sleep state or a power-down state to a working state;
the image acquisition device is configured to acquire original image data; and
the image data processor is configured to obtain the original image data and process the original image data;
wherein the image data processor comprises a first image data processor and a second image data processor;
the image acquisition device is in communication with the first image data processor, and the second image data processor is in communication with the image acquisition device and the first image data processor;
the first image data processor is configured to obtain the original image data, preprocess the original image data to obtain first image data, and transmit the first image data to the second image data processor;
the second image data processor is configured to process the first image data using a target algorithm to obtain a processing result, and control the image acquisition device and/or the first image data processor based on the processing result; and operational power consumption of the second image data processor is less than operational power consumption of the application processor.

10. The wearable device according to claim 9, wherein the second image data processor comprises a Microprogrammed Control Unit.

11. The wearable device according to claim 9, wherein the first image data processor comprises an image signal processor.

12. The wearable device according to claim 11, wherein the target algorithm comprises auto focus, auto exposure, and automatic white balance algorithms.

13. The wearable device according to claim 9, wherein the application processor is configured to control, in a case of detecting that the wearable device disables the shooting preview mode, the image data processor to switch from the working state to the sleep state or the power-down state,
wherein the application processor automatically switches to the sleep state in a case that the image data processor is in the working state.

14. The wearable device according to claim 9, wherein the image signal processing apparatus further comprises an image encoder, a video encoder, and a data storage, wherein
the image encoder and the video encoder are in communication with the second image data processor and the application processor, and the data storage is in communication with the application processor;
the image encoder is configured to perform image encoding processing based on an image parameter in the processing result to obtain an image encoding result and transmit the image encoding result to the application processor;
the video encoder is configured to perform video encoding processing based on the image parameter in the processing result to obtain a video encoding result and transmit the video encoding result to the application processor; and
the application processor is configured to transmit the image encoding result and the video encoding result to the data storage for storage.

15. The wearable device according to claim 14, wherein:
the image signal processing apparatus further comprises a display controller and a displayer, wherein
the display processor is in communication with the second image data processor and the displayer;
the display processor is configured to perform display processing on the processing result to obtain a display processing result and transmit the display processing result to the displayer for display; and/or
the image signal processing device further comprises a data transmission interface; wherein:
the data transmission interface is in communication with the image acquisition device and the first image data storage unit; and
the first image data storage unit obtains the original image data acquired by the image acquisition device through the data transmission interface.

16. The wearable device according to claim 15, wherein:
the image data processor, the application processor, the data transmission interface, the image encoder, the video encoder, the data storage, and the display controller are built into an SOC chip of the wearable device; and/or the data transmission interface comprises a Mobile Industry Processor Interface-Camera Serial Interface.

* * * * *